United States Patent Office 3,814,726
Patented June 4, 1974

3,814,726
PROCESS FOR COLORING PRODUCTS OF HIGH MOLECULAR WEIGHT WITH PIGMENTS
Paul Hugelshofer and Fritz Kugler, Muttenz, Switzerland, assignors to Ciba-Geigy AG, Basel, Switzerland
No Drawing. Continuation of application Ser. No. 98,115, Dec. 14, 1970, which is a continuation-in-part of application Ser. No. 760,082, Sept. 16, 1968, both now abandoned. This application June 1, 1972, Ser. No. 258,641
Int. Cl. C08f 45/14; C09b 3/30
U.S. Cl. 260—42.21
3 Claims

ABSTRACT OF THE DISCLOSURE

Dibenzanthrone sulfonamides or isodibenzanthrone sulfonamides are useful for coloring high-molecular organic products in violet shades having excellent fastness properties.

CROSS-REFERENCES TO RELATED APPLICATIONS

This is a continuation of Ser. No. 98,115 filed Dec. 14, 1970 and now abandoned which is a continuation-in-part of Ser. No. 760,082 filed Sept. 16, 1968 and now abandoned.

Violet pigments are very important, especially for shading copperphthalocyanines. Hitherto, the products mainly available have been dioxazine pigments and isodibenzanthrone and the halogenation products thereof. Although some special dioxazine pigments go a long way towards satisfying the high demands made on fastness properties at the present time, they have the disadvantage that they are not sufficiently stable towards flocculation in lacquers; furthermore, their price imposes a limit on their wider application. Although isodibenzanthrone and the halogenation products thereof are advantageous in respect of price and show good resistance to flocculation in lacquers, they are not sufficiently fast to migration for many purposes. (see for ex. Journal of the Oil and Color Chemists Ass. 46, pages 23–24 (1963).

The present invention invention is based on the surprising observation that dibenzanthrones and isodibenzanthrones containing sulphonamide groups are economic pigments possessing excellent fastness to light and migration and which, compared with the dioxazines, display greatly improved resistance to flocculation. Thus, the advantages of the two classes of pigment mentioned above are combined in these products.

The pigments to be used in accordance with the invention preferably correspond to the formula

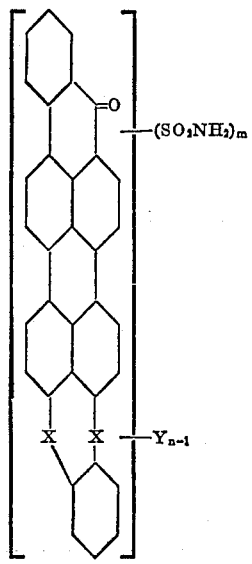

in which one of the symbols X represents a carbonyl group and the other represents a direct bond, Y represents a halogen atom, $m$ represents an integer within the range of from 1 to 3 and $n$ represents an integer within the range of from 1 to 5. Such compounds are known and may be obtained, for example, by the process described in Example 8 of British Patent Specification No. 807,224 in which isodibenzanthrone or dibenzanthrone is treated with chlorosulphonic acid and the sulphochloride so obtained is reacted with ammonia.

Mixtures of monosulphonamides and disulphonamides are generally obtained, the latter preferably slightly predominating, corresponding to a mean sulphonamide content of 1.5 to 1.8. The pigments may also contain 1 to 4, preferably 1 or 2, halogen atoms. The introduction of the halogen atoms may be effected either prior to or subsequent to the introduction of the sulphonamide groups.

The following are given as examples of materials to be colored in accordance with the process of the present invention; plastic materials, for example, rubber and casein; polymerization resins, for example, polyvinyl chloride and the copolymers thereof, polyvinyl acetals, polyolefins, for example, polyethylene, polypropylene and polystyrene and copolymers thereof with polyesters derived from unsaturated dicarboxylic acids and diols, polyacrylates and the copolymers thereof, silicones and silicone resins. The pigments to be used in accordance with the invention are also suitable for use in the preparation of colored condensation resins, for example, polyamides and especially aminoplasts, for example, urea-formaldehyde or melamine-formaldehyde resins, polyaddition resins, for example, epoxy or polyurethane resins or alkyd resins, and they are also suitable for use in the preparation of colored lacquers containing one or more of the said resins in an organic solvent, for example lacquers from nitro cellulose acrylic resin, alkyd-melamine resin, silicon resin, epoxide resin or chlorinated rubber, or aqueous emulsions containing one or more of the said resins or precondensates, if necessary, in the presence of organic solvents, for example, an oil-in water or a water-in oil emulsion. Such emulsions are specially suitable for impregnating or printing textile materials or other sheet-like materials, for example, paper, leather and glass fibre fabrics, if necessary, with subsequent curing by a heat treatment. The pigments to be used in accordance with the process of the invention may also be applied in the production of spun-colored fibres, for example, fibres made from viscose, cellulose esters, polyesters or polyacrylonitrile. It may also be used with advantage in the preparation of printing incs.

The pigments to be used in accordance with the process of the invention, which are obtained from the synthesizing process in a physically usable form, are advantageously converted into a state of fine division prior to application, for example, by grinding in a dry or water-moist state in the presence or absence of an organic solvent and/or a salt that can be washed out.

The pigments to be used in accordance with the process of the invention may be used in the pure form as so-called toners or in the form of preparations in which the pigment is present in a state of fine division, for example, in a particle size not exceeding $3\mu$. Such preparations may contain the usual additives, for example, dispersing agents or binders, and may be produced in a manner known per se by an intensive mechanical treatment, for example, on a roller mill or in a suitable type of kneading apparatus. The choice of a dispersing medium which permits intensive processing depends on the kind of preparation to be produced. For example, sulphite cellulose waste liquor or salts of dinaphthylmethane disulphonic acid may be used in the production of aqueous, dispersible preparations and cellulose acetate mixed with a small amount of solvent may be used for preparations employed in the spinning of cellulose acetate rayon.

By virtue of their chemical inertness and good thermal stability, the pigments can generally be dispersed easily in the compositions or preparations of the type mentioned, advantageously at some stage before they have been processed to their final form. The final processing operations, for example, spinning, moulding, curing, casting, bonding and so forth, may then be carried out in the presence of the pigment without any danger of impairing chemical reactions to which the substratum may be subjected, for example, further polymerization, condensation or polyaddition.

The colorations obtained with the pigments to be used in accordance with the process of the invention are distinguished by excellent fastness to light and migration.

The following Examples illustrate the invention. Unless otherwise stated, the parts and percentages are by weight.

Example 1

5 parts of the pigment of the formula

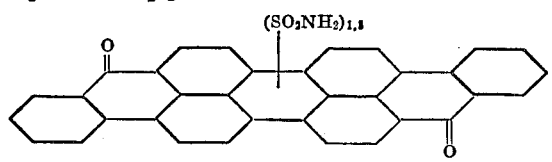

are mixed with 95 parts of dioctyl phthalate, and the mixture is ground in a ball mill until the pigment particles are smaller than $3\mu$.

0.8 part of this dioctyl phthalate paste is then mixed with 13 parts of polyvinyl chloride, 7 parts of dioctyl phthalate, 0.1 part of cadmium stearate and 1 part of titanium dioxide, and the mixture so obtained is worked to and fro for 5 minutes on a two-roller mill at 140° C. A violet coloration possessing very good fastness to light and migration is obtained.

The pigment used in this Example may be prepared in the following manner:

11.4 parts of isodibenzanthrone are introduced at room temperature (15 to 25° C.) into 210 parts of chlorosulphonic acid, whereupon a green solution forms. 6 parts of thionyl chloride are added to this solution, the reaction mixture is heated to 80° C. and then stirred for 2 hours at 80 to 85° C. (internal temperature). The reaction mixture is then cooled to approximately 10° C. and carefully discharged on to a mixture of 2,200 parts of ice and 800 parts of water. The sulphochloride which precipitates is isolated by suction filtration and washed free from mineral acid with cold water (until the pH of the washing water is about 3 to 4). The moist sulphochloride filter cake is suspended in 350 parts of 24% aqueous ammonia at 10 to 15° C., the suspension is cooled to 0° C., stirred for 2 hours at 0 to 5° C., then for 14 hours at room temperature (15 to 25° C.) and finally for 1 hour at 50 to 60° C. The reaction mixture is suction-filtered while warm and the filter residue is washed with hot water until the filtrate runs colorless and neutral. The filter residue is then covered several times with hot alcohol and dried in vacuo at 50 to 60° C. 15 parts of a mixture are obtained which consists of approximately equal parts of isodibenzanthrone monosulphonamide and isodibenzanthrone disulphonamide.

Example 2

40 parts of a nitrocellulose lacquer, 2.375 parts of titanium dioxide and 0.125 part of the pigment mentioned in the first paragraph of Example 1 are ground in a rod mill for 16 hours. A thin coating of the lacquer so obtained is applied to aluminum foil. A violet coating possessing very good properties of fastness is obtained.

Example 3

A mixture comprising 25 parts of the pigment mentioned in the first paragraph of Example 1, 25 parts of cellulose acetate (54.5% combined acetic acid), 100 parts of sodium chloride and 50 parts of diacetone alcohol is treated in a kneader, with cooling, until the pigment has the fine particle size required. 25 parts of water are then added and kneading is continued until a fine-grained mass is obtained. The mass is then transferred to a suction filter and the sodium chloride and diacetone alcohol are washed out completely with water. The batch is dried in a vacuum cabinet at 85° C. and ground in a hammer mill.

1.33 parts of the pigment preparation so obtained are added to an acetate rayon spinning composition consisting of 100 parts of cellulose acetate and 376 parts of acetone. The batch is stirred for 3 hours, which is sufficient to ensure complete dispersion of the pigment. The dope so obtained is spun into a filament in the usual manner by the dry-spinning process. The filament displays a violet coloration which possesses very good fastness to light, washing and hypochlorite.

Example 4

0.25 part of the pigment mentioned in the first paragraph of Example 1, 40 parts of an alkyd-melamine stoving lacquer having a 50% solids content, and 4.75 parts of titanium dioxide are ground for 24 hours in a rod mill. A thin coating of the lacquer so obtained is applied to aluminium foil and stoved for one hour at 120° C. A violet coating possessing good fastness to light is obtained.

Example 5

4.8 parts of the pigment mentioned in the first paragraph of Example 1 and 4.8 parts of the sodium salt of 1,1'-dinaphthylmethane-2,2'-disulphonic acid and 22.1 parts of water are ground in a colloid mill of known design until all the pigment particles are smaller than $1\mu$. The pigment suspension so obtained has a pigment content of about 15%.

The aqueous suspension so obtained is added to a viscose spinning solution and a violet-colored cellulose filament is spun therefrom by the usual process. The coloration displays good fastness to light and hypochlorite.

Example 6

A dyebath is prepared containing per 1,000 parts of water, 15 parts of a copolymer latex prepared from 85.8 parts of isobutylacrylate, 9.6 parts of acrylonitrile and 4.6 parts of acrylic acid, 15 parts of a 70% emulsion of a methylolmelamineallylether modified with soya fatty acid and emulsified with sulphonated castor oil, 50 parts of a water-soluble methyl ether of a urea-formaldehyde condensation product containing, per mol of urea, more than 2 mols of formaldehyde incorporated by condensation, 5 parts of the pigment suspension obtained in the manner described in the first paragraph of Example 5, and 20 parts of 10% formic acid.

A dry cotton fabric is padded at room temperature with the above dye-liquor to a liquor uptake of 65 to 80%, dried in the normal manner, if necessary, under tension (clip stenter or pin stenter) and then cured for 5 minutes at 145 to 150° C. A violet dyeing possessing good properties of fastness is obtained.

Example 7

100 parts of the pigment mentioned in the first paragraph of Example 1, 40 parts of the product obtained by additively combining 15 mols of ethylene oxide with 1 mol of ditertiary-butyl-para-cresol and 20 parts of water are mixed in a kneading apparatus to form a viscous, homogeneous dough. Kneading is carried out until the pigment agglomerates which form on drying are uniformly and finely dispersed. The dough is carefully diluted with 90 parts of water while continuing the kneading process and then homogenized by means of a cone mill or some other suitable apparatus in a manner such that a viscous, homogeneous paste is formed which contains dispersed pigment primary particles virtually all of which have a diameter not greater than 3μ. 250 parts of a violet paste containing 40% of pigment are obtained.

60 parts of this paste are mixed with 850 parts of an oil-in-water emulsion containing 55% of petroleum hydrocarbons, 5% of a styrene-butadiene emulsion copolymer and 3.5% of a solution comprising about 75% by weight of a water-insoluble melamine-formaldehyde primary condensate modified with n-butanol and about 25% by weight of n-butanol as separate inner phases and 36.5% of an aqueous solution containing 7.5 parts by weight of a non-ionic emulsifier prepared in accordance wtih Example 3 of U.S. Pat. No. 2,946,767, filed July 26, 1960 by Hans Gassmann per 92.5 parts by weight of water as outer phase, 80 parts of water and 10 parts of ammonium nitrate, totalling 1,000 parts, to form a homogeneous, viscous paste.

Fabrics made of natural or regenerated cellulose or synthetic fibers of all kinds may be printed with this paste, application being effected in the usual manner by means of rollers or screens. After drying at room temperature or at an elevated temperature and a subsequent heat treatment for a few minutes at 120 to 150° C., a violet print possessing excellent fastness to rubbing, washing and light is obtained.

Example 8

A mixture comprising 50 parts of the pigment mentioned in the first paragraph of Example 1, 100 parts of Staybelite Ester 10 (glycerol ester of hydrogenated colophony), 200 parts of sodium chloride and 18 parts of diacetone alcohol is treated in a kneader, while cooling, until the pigment has the fine particle size required. The sodium chloride and the diacetone alcohol are then removed from the dough by the introduction of water at 80° C. The dough itself remains intact. The dough, which is free from salt and solvent, is completely dried by heating the kneader with steam, allowed to cool, and then pulverized in the kneader.

The preparation so obtained may be used, for example, for coloring lacquers. When used for this purpose, the preparation is advantageously pasted with a small amount of toluene and the paste so obtained is then mixed with the lacquer.

Example 9

150 parts of the dry pigment mentioned in the first paragraph of Example 1, 300 parts of a 20% casein solution, 40 parts of a dispersing agent and 250 parts of distilled water are ground in a suitable device until most of the pigment particles measure less than 1μ. The pigment paste so obtained is mixed with 50 parts of a 30% wax emulsion and a further 200 parts of a 20% casein solution and the mixture is stirred to produce a homogeneous 15% pigment paste. 50 parts of the 15% pigment preparation so obtained are well mixed with 100 parts of a 20% casein solution, 5 parts of sodium sulphoricinoleate, 50 parts of a 10% egg albumin solution and 870 parts of distilled water.

The pigment dispersion so obtained which is ready for use is applied in one or two coats to dyed full-chrome grain leather by means of a plush pad or a brush. A levelling coat of the same pigment dispersion is then sprayed on under a pressure of 4 to 5 atmospheres. A 20% casein solution is then applied in the same manner, dried for a short period and then hardened with 8 to 10% formaldehyde solution. The application of the pigment is concluded by machine glazing and hydraulic pressing at 60 to 80° C. under a pressure of 150 to 200 atmospheres. The coloration displays good fastness to light, excellent fastness to wet rubbing and a high degree of transparency.

Example 10

1 part of the pigment mentioned in the first paragraph of Example 1 is mixed with 99 parts of high-pressure polyethylene and the mixture is worked to and fro for 10 minutes on a roller mill at 140 to 170° C. A violet film possessing excellent fastness to light and migration is obtained. The film may be granulated and the granules used for injection moulding or film-blowing.

Example 11

The following layers are prepared for use in the manufacture of laminated sheet material:

(a) Strong paper made from unbleached sulphate cellulose (so-called Kraft paper) is saturated with an aqueous phenol-formaldehyde resin solution, squeezed and dried.

(b) Paper made from pure, chemically bleached cellulose and containing zinc sulphide or titanium dioxide as filler as saturated with a 50% aqueous solution of dimethylolmelamine, squeezed and dried at 100° C.

(c) 400 parts of decorative paper made from bleached cellulose and containing zinc suphide or titanium dioxide as filler are ground in a beater in 10,000 parts of water. 30 parts of the pigment suspension obtained in the manner described in Example 5 are added to the pulp so obtained. The pigment is fixed by the addition of 16 parts of aluminium sulphate. The colored decorative paper is saturated with a 50% aqueous solution of dimethylolmelamine, squeezed, and then dried at 100° C.

(d) Depending on the quality of laminate required, the decorative paper is protected with tissue paper made of bleached special cellulose which weighs 40 grams per square meter. The tissue paper is also saturated with a 50% aqueous solution of dimethylolmelamine, squeezed, and then dried at 100° C.

Equal-sized pieces of the material so prepared, for example, measuring 2.75 meters x 1.25 meters, are then placed one upon the other in the following order: first, 3 to 5 sheets of paper (a), one sheet of paper (b), one sheet of paper (c) and, if desired or required, one sheet of paper (d). The whole assembly is then compressed between high-gloss chromium-plated plates for 12 minutes at 140 to 150° C. under a pressure of 100 kg. per square centimeter. The press is cooled to 30° C. and the composite material so formed is removed. It is colored violet on one side and the coloration has good fastness to light.

Example 12

130 parts of an aqueous pigment paste of a mixture of isodibenzanthrone mono- and disulphonamide (moist press-cake, obtained in accordance with Example 1) having a pigment content of 27% and 34 parts of behenic acid are treated in a kneader for 15 minutes at 60° C. The water that separates is decanted. 2.9 parts of magnesium hydroxide are added and kneading is continued at 100° C.; the water which forms evaporates. When the whole has been homogeneously mixed, the product obtained is ground. A preparation containing 50% of pigment is obtained in the form of a fine powder.

1 part of the preparation so obtained is mixed with 100 parts of polypropylene and the mixture is stirred for 45 minutes at 280° C. in a nitrogen atmosphere. When the melt is extruded through a die, a polypropylene strip colored a bluish violet is obtained. When the strip is cool it can be granulated and the granules may be used for injection moulding.

Example 13

Two mixtures are prepared, each comprising 1 part of the pigment preparation obtained in accordance with Example 12 and 100 parts of polystyrene. One mixture is stirred for 45 minutes at 280° C. and the other for 15 minutes at 300° C., stirring being carried out in a nitrogen atmosphere in each case. When the melts are extruded through a die, bluish violet polystyrene strips are obtained which, when cool, can be granulated and the granules may be used for injection moulding.

Example 14

1 part of the finely divided pigment mentioned in Example 1 is added to a solution of 165 parts of polyacrylonitrile in 834 parts of dimethylformamide. The spinning solution so obtained is extruded through a die into a precipitating bath consisting of water having a temperature of 90° C. A bluish violet fibre possessing excellent fastness to light, washing and chlorite is obtained.

Example 15

99 parts of a polyamide made from ε-caprolactam in the form of chips are coated with one part of the finely divided pigment mentioned in Example 1 in the form of a dry powder. The powdered chips are spun in the usual manner, for example, by the grid-spinning process, at about 290 to 295° C. The filament so obtained has a bluish violet coloration which possesses good fastness to light and wet treatments.

Example 16

99 parts of polyethylene terephthalate chips are coated with one part of the finely divided pigment mentioned in Example 1 in the form of a dry powder, and then melted and spun in the usual manner. The polyester filament so obtained has a bluish violet coloration which displays outstanding properties of fastness.

Example 17

A reddish blue coloration is obtained when the isodibenzanthrene sulphonamide used in the preceding Examples is replaced by a dibenzanthrone sulphonamide.

The pigment may be obtained in the following manner: 11.4 parts of dibenzanthrone are introduced at room temperature into 210 parts of chlorosulphonic acid, whereupon a reddish violet solution forms. 6 parts of thionyl chloride are added to the solution, the reaction mixture is heated to 70° C. and then stirred for 2 hours at that temperature. The reaction mixture is then cooled to 10° C. and carefully discharged on to a mixture of 2,200 parts of ice and 800 parts of water. The sulphochloride which precipitates is isolated by suction filtration and washed with cold water until the washings have a pH of 4. The moist filter cake is suspended in 350 parts of 24% aqueous ammonia at 10 to 15° C., the suspension is cooled to 0° C. and then stirred, first for 2 hours at 0 to 5° C., then for 15 hours at room temperature and finally for one hour at 50 to 60° C. The reaction mixture is then suction-filtered while warm and the filter residue is washed with hot ammoniacal water until the washings run colorless. The filter residue is then washed with hot water until the washings run neutral and finally covered with hot alcohol. The residue is dried in vacuo at 60 to 70° C. 14.5 parts of a mixture of dibenzanthrone mono- and disulphonamide having a mean sulphonamide group content of 1.55 to 1.60 groups per molecule are obtained.

Example 18

A bluish red coloration is obtained when the pigment used in Examples 1 to 16 is a dichloro-isodibenzanthrone sulphonamide.

The pigment may be obtained in the following manner: 13.1 parts of dichloroisodibenzanthrone are introduced at room temperature into 210 parts of chlorosulphonic acid, whereupon a green solution forms. 6 parts of thionyl chloride are added to this solution, the reaction mixture is heated to 100° C. and then stirred for 4 hours at that temperature. The reaction mixture is then carefully discharged on to a mixture of 2,200 parts of ice and 800 parts of water. The sulphochloride, which precipitates is isolated by suction filtration and washed with cold water until the washings have a pH of 4. The moist sulphochloride filter cake is suspended in 350 parts of 24% aqueous ammonia at 10 to 15° C., the suspension is cooled to 0 to 5° C. and then stirred for 2 hours at that temperature, then for 16 hours at room temperature and finally for one hour at 60° C. The reaction mixture is suction-filtered while warm, and the filter residue is washed with hot ammoniacal water until the filtrate runs colorless. The filter residue is then washed with hot water until the washings run neutral, covered several times with hot alcohol and then dried in vacuo at 60 to 70° C. 16 parts of a mixture consisting of dichloroisodibenzanthrone mono- and disulphonamide having a mean sulphonamide group content of 1.5 groups per molecule are obtained.

Example 19

A reddish violet coloration is obtained when the pigment obtained in the manner described below is used in Examples 1 to 16.

11.4 parts of isodibenzanthrone are introduced at room temperature into 210 parts of chlorosulphonic acid. 6 parts of thionyl chloride are added, the reaction mixture is heated to 85° C. and stirred for 2 hours at that temperature. The temperature is raised to 100° C., a few grains of iodine are added to the reaction mixture and then 4.0 parts of bromine are added dropwise within 2 hours. After a further 2 hours, the reaction mixture is cooled to 10° C. and then carefully discharged on to a mixture of 1,500 parts of ice and 500 parts of water. The sulphochloride which precipitates is isolated by suction filtration and the filter residue is washed free from mineral acid with cold water until the washings have a pH of 4. The moist filter cake is suspended in 350 parts of 24% aqueous ammonia, the suspension is cooled to 0° C., stirred for 2 hours at 0 to 5° C., then for 16 hours at room temperature and finally for one hour at 60° C. The reaction mixture is suction-filtered, and the filter residue is washed with hot alkaline water until the filtrate runs colorless. The filter residue is then washed with hot water until the washings run neutral, covered several times with hot alcohol and then dried in vacuo at 60 to 70° C. 16.5 parts of a mixture of halogenated isodibenzanthrone mono- and disulphonamides are obtained, which mixture has a sulphonamide group content of 1.8 groups per molecule, a chlorine content of 3.7% and a bromine content of 22.9%, which corresponds to an average of 0.79 chlorine atoms and 2.19 bromine atoms per molecule.

Example 20

A reddish blue coloration is obtained when the pigment obtained in the manner described below is used in Examples 1 to 16.

11.4 parts of dibenzanthrone are introduced at room temperature into 210 parts of chlorosulphonic acid. 6 parts of thionyl chloride are added to this solution and the reaction mixture is heated to 85° C. and stirred for 2 hours at that temperature. A few grains of iodine are added and then 3.5 grams of chlorine are introduced within 1½ hours, the temperature being kept at 85° C. The reaction mixture is then cooled and carefully discharged on to a mixture of 1,500 parts of ice and 500 parts of water. The sulphochloride which precipitates is isolated by suction filtration and then washed with cold water until the washings have a pH of 4. The moist filter cake is then suspended in 350 ml. of 24% aqueous ammonia. The suspension is then stirred for 2 hours at 0 to 5° C., for 15 hours at room temperature and finally for one hour at 60° C. The reaction mixture is filtered, the filter residue is washed with hot ammoniacal water until the washings run colorless and then with hot water until the washings show a neutral reaction. The residue is covered several times with hot alcohol and then dried in vacuo at 60 to 70° C. 8.3 parts of a mixture of chlorinated dibenzanthrone mono- and disulphonamide are obtained, which mixture has a mean sulphonamide group content of 1.8 groups per molecule and a chlorine content of 5%, which corresponds to 0.9 chlorine atoms per molecule.

Example 21

A reddish blue coloration may also be obtained when the pigment obtained in the manner described below is used in Examples 1 to 16.

11.4 parts of dibenzanthrone are introduced at room temperature into 210 parts of chlorosulphonic acid. 6 parts of thionyl chloride are added to this solution. The reaction mixture is heated to 85° C. and stirred at that temperature for 2 hours. The temperature is then raised to 100° C. A few grains of iodine are added and then 4 parts of bromine are added dropwise within one hour and the batch is stirred for a further 2 hours at 100° C. The reaction mixture is then cooled to 10° C. and discharged carefully on to a mixture of 1,500 parts of ice and 500 parts of water. The sulphochloride which precipitates is isolated by suction filtration and washed free from mineral acid with cold water until the washings have a pH of 4. The moist filter cake is suspended in 350 ml. of 24% aqueous ammonia and the suspension is stirred for 2 hours at 0 to 5° C., then for 15 hours at room temperature and finally for one hour at 60° C. The reaction mixture is suction-filtered and the filter residue is washed with hot amoniacal water until the washings run colorless and then with hot water until the washings show a neutral reaction. The filter residue is then covered several times with hot alcohol and then dried in vacuo at 60 to 70° C. 13.7 parts of a mixture halogenated dibenzanthrone mono- and disulphonamide are obtained, which mixture has a mean sulphonamide group content of 1.85 groups per molecule, a chlorine content of 3.1%, corresponding to 0.64 chlorine atoms per molecule, and a bromine content of 14.8%, corresponding to 1.36 bromine atoms per molecule. SGGS of Messrs, Siegle), 1 part of cellulose acetobutyrate and 0.3 part of diacetone-alcohol.

The resulting kneaded mass is decomposed by adding 1 part of 25% aqueous sodium chloride solution, granulated, and worked-up as in Example 1.

Example 22 (acrylic resin stoving lacquer)

8 parts of the preparation obtained according to Example 1 are stirred into 20 parts of solvent of the following composition: 50 parts of Solvesso 150, 15 parts of butyl acetate, 5 parts of Exkin II (levelling agent), 25 parts of methyl isobutyl ketone and 5 parts of silicone oil (1% in Solvesso 150). After complete fine distribution has been achieved (in about 15-60 minutes depending on the nature of the stirrer) the binders are added, namely 48.3 parts of Baycryl L 530 (51% in xylene/butanol, 3:1) and 23.7 parts of Maprenal TTX (55% in butanol). After brief homogenisation the lacquer is applied according to usual methods for example spraying and dipping or especially, for the continuous coating of sheet metal, by the "coil coating" process, and is stoved (stoving 30 minutes, 130° C.). The resulting blue lacquerings are distinguished by very good levelling, high gloss and excellent fine distribution of the pigment as well as by excellent resistance to weathering.

The preparations obtained according to Examples 2-10 can be employed instead of the preparation obtained according to Example 1 with equally good results.

Example 23 (alkyd-melamine resin stoving lacquer)

8 parts of the pigment preparation obtained according to Example 1 are distributed in 22 parts of the following solvent mixture during 35 minutes at room temperature in a gear wheel stirrer running at 3000 revolutions per minute: Solvent mixture: 10 parts of xylene, 4 parts of ethylene glycol monoethyl ether, 4 parts of acetic acid butyl ester, 2 parts of n-butanol, 1 part of levelling agent and 1 part of 1% silicone oil solution in xylene. After complete fine distribution the binder solutions are added with further stirring: 23.5 parts of Cardura 30, 80% in xylene (Shell), 25.0 parts of Alkydal F 25, 75% in xylene (Bayer) and 21.5 parts of Cibamin H 86, 75% in butanol (CIBA). After stirring for 15 minutes the lacquer is applied in the usual manner and cured for 30 minutes at 135° C.

The preparations obtained according to Examples 2-10 can be employed instead of the preparation obtained according to Example 1 with equally good results.

Example 24 (silicone resin lacquer)

8 parts of a pigment preparation obtained according to Example 5 are distributed in 22 parts of a solvent mixture consisting of 10 parts of xylene, 8 parts of acetic acid butyl ester and 2 parts of cyclohexanone during 35 minutes at room temperature in a gear wheel stirrer running at 3000 revolutions per minute.

After complete fine distribution a binder solution consisting of 68.5 parts of silicone resin UD 160 (Bayer), 75% in xylene/butanol 8:2, 1 part of polymeric butyl titanate and 0.5 part of lead naphthenate containing 30% of lead is added with further stirring.

After stirring for 15 minutes the lacquer is applied in the usual manner or by the "coil coating" process and is cured for 30 minutes at 200° C.

The preparations obtained according to Examples 1-4 and 6-10 can be employed instead of the preparation obtained according to Example 5 with equally good results.

Example 25 (epoxide resin lacquer)

5.0 parts of the pigment preparation obtained according to Example 1 are distributed in 23.0 parts of a solvent mixture consisting of 3.0 parts of n-propanol, 6.0 parts of ethylene glycol monoethyl ether, 6.0 parts of ethylene glycol ethyl ether acetate and 8.0 parts of xylene in the same manner as in Example 12.

53.2 parts of a binder solution I consisting of: 21.3 parts of Araldite 6097 (CIBA), 14.4 parts of diacetone-alcohol, 3.2 parts of o-dichlorobenzene and 14.3 parts of xylene, as well as 18.8 parts of binder solution II consisting of a solution of 75% of Cibamin H 53 (CIBA) in butanol are added with further stirring.

After stirring for 15 minutes the lacquer is applied in the usual manner and cured for 30 minutes at 180° C.

The preparations obtained according to Examples 2-10 can be used instead of the preparation obtained according to Example 1 with equally good results.

We claim:

1. Polyvinyl chloride in which a pigment of the formula

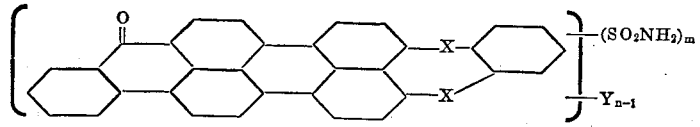

is incorporated, in which one of the symbols X represents a carbonyl group and the other represents a direct bond, Y represents a halogen atom, m represents an integer within the range of from 1 to 3 and n represents an integer within the range of from 1 to 5.

2. Polyvinyl chloride as claimed in claim 1 in which a pigment of the formula

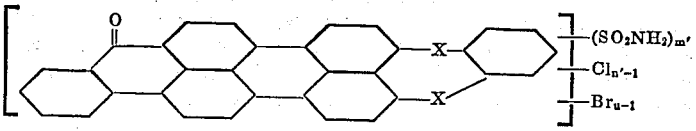

is incorporated, in which X has the meaning ascribed to it in claim 2, $m'$ stands for 1 or 2 and $n'$ and $u$ each represents an integer within the range of from 1 to 4, the sum of $n'$ and $u$ being not greater than 4.

3. Polyvinyl chloride as claimed in claim 1 which a pigment of the formula

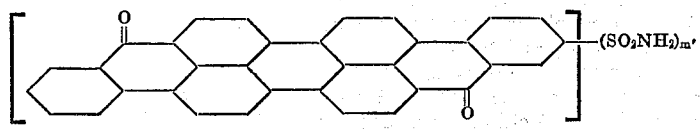

is incorporated in which $m'$ is 1 or 2.

References Cited

UNITED STATES PATENTS

| | | | |
|---|---|---|---|
| 3,133,893 | 5/1964 | Newman | 260—41 C |
| 3,139,429 | 6/1964 | Weber | 260—354 |
| 3,187,021 | 6/1965 | Weber | 260—354 |
| 3,515,732 | 6/1970 | Staeuble | 260—354 |

FOREIGN PATENTS 807,224  1/1959  Great Britain.

MORRIS LIEBMAN, Primary Examiner

P. R. MICHL, Assistant Examiner

U.S. Cl. X.R.

106—148; 260—37 P, 39 P, 354